H. F. WHEELER,
Assignor to J. M. MARLIN.
Magazine Fire Arms.
No. 9,461. Reissued Nov. 9, 1880.
Fig. 4.
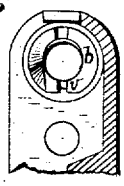
Fig. 1.
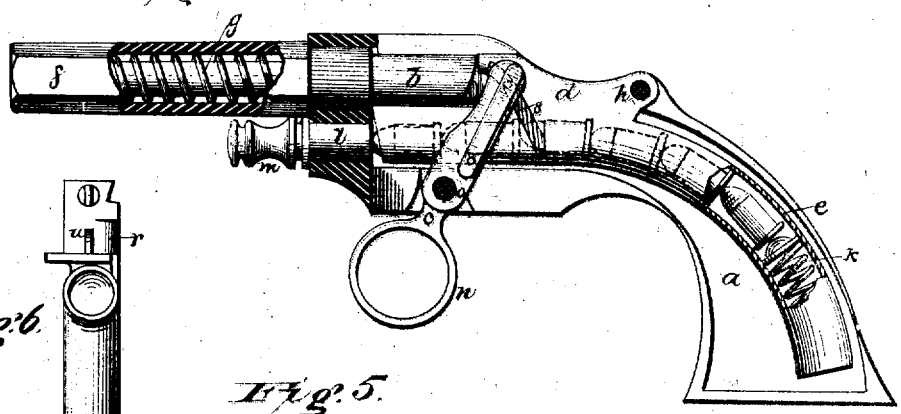
Fig. 6.
Fig. 5.
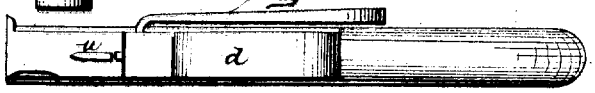
Fig. 7.
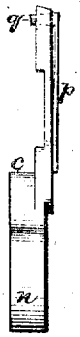
Fig. 2.
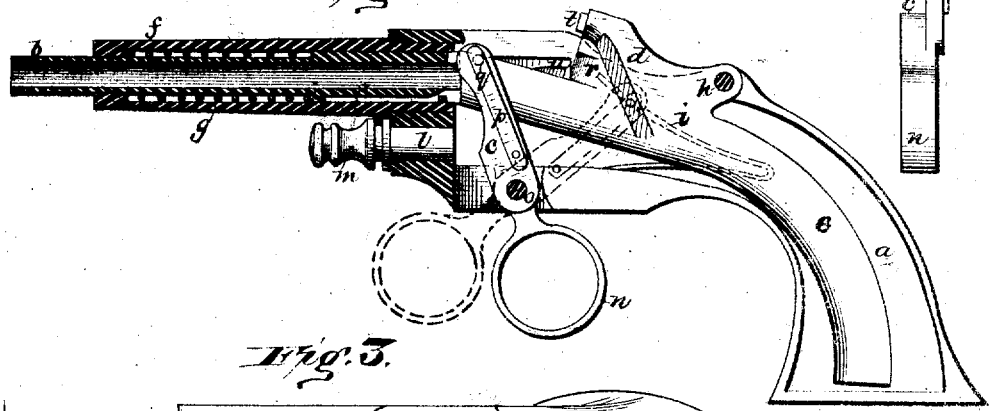
Fig. 3.
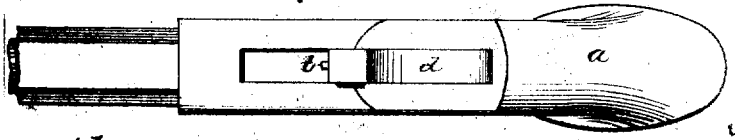
Witnesses:
Frank L. Durand
Owell a. Crick
Inventor:
Henry F. Wheeler
by attorney,
M. Bailey

UNITED STATES PATENT OFFICE.

HENRY F. WHEELER, OF BOSTON, MASSACHUSETTS, ASSIGNOR TO JOHN M. MARLIN, OF NEW HAVEN, CONNECTICUT.

MAGAZINE FIRE-ARM.

SPECIFICATION forming part of Reissued Letters Patent No. 9,461, dated November 9, 1880.

Original No. 46,286, dated February 7, 1865. Application for reissue filed October 12, 1880

*To all whom it may concern:*

Be it known that I, HENRY F. WHEELER, of Boston, in the county of Suffolk and State of Massachusetts, have invented Improvements in Magazine Fire-Arms; and I do hereby declare that the following, taken in connection with the drawings which accompany and form part of this specification, is a description of my invention sufficient to enable those skilled in the art to practice it.

My invention relates to the construction of that class of magazine or repeating fire-arms in which fixed ammunition loaded at the breech is employed.

The invention consists, primarily, in a fire-arm having a sliding barrel, the charge of which, inserted at the breech, is fired by driving the barrel back against a percussion or breech block.

The invention also consists in the construction, arrangement, and mode of operating the barrel, the magazine, and the breech-piece or percussion-block.

It further consists in the arrangement in the frame or receiver of the magazine, the barrel, the breech-piece, and the mechanism by which the cartridges are transferred from the magazine to the barrel, in such manner that the magazine may be filled with cartridges through an opening in the frame or receiver while the part which conveys the magazine-cartridges to the barrel is down, the breech is closed, and all the operative parts are in their place of rest.

A pistol embodying my improvements is shown in the drawings, Figures 1 and 2 representing sectional side elevations thereof, with the side or face plate of the frame or receiver for the operative parts and of the stock or handle removed. Fig. 3 is a top view. Fig. 4 is a sectional rear elevation of a portion of the front part of the frame or receiver, showing the rear end of the barrel in place therein; Fig. 5, a top view of the magazine-tube and breech-piece or percussion-block, and Fig. 6 a front-end view thereof. Fig. 7 is an edge view of the trigger-lever.

*a* denotes the frame or receiver containing the operative parts and prolonged at the rear into the customary stock or handle; *b*, the barrel; *c*, the trigger; *d*, a movable breech or percussion-piece, and *e* the cartridge-magazine.

The barrel *b* is contained within a long cylinder or case, *f*, in which it slides, its forward end projecting from the case when the arm is cocked, as seen in Fig. 2, and the barrel sliding back when the arm is fired, so that said forward end is or may be flush with the corresponding end of its case *f*, as seen in Fig. 1.

The exterior and interior diameters of the barrel and its case, respectively, at the muzzle end correspond; but at a short distance within the case the diameter of the latter is enlarged, as seen in Fig. 2, and the barrel near its breech end is also of enlarged diameter, a spiral spring, *g*, surrounding the barrel *b*, abutting at its opposite ends against the two shoulders formed in the case *f* and upon the barrel *b*, said spring driving the barrel *b* against the breech-piece or block *d* when the piece is fired, and holding it against the forward end of said breech-piece or the magazine connected therewith when the arm is cocked.

The breech-piece *d* is hung upon a screw-pin, *h*, extending through the frame *a*, and upon the under side of this breech-piece is a long curved mazazine or cartridge-tube, *e*, said tube being made integral with the breech-piece or so applied to it that they move as one piece, having only a vertical rocking movement upon the pin *h*.

The frame or handle *a* is made hollow for the movement of the magazine-tube, and a spring, *i*, tends to hold the tube (and breech-piece) normally in the position seen in Fig. 2. Within the magazine-tube are placed the cartridges to be fired, a spring, *k*, pressing them toward the front end of the tube, as will be readily understood, and as is common in other arms—like the Spencer rifle, for instance—having magazine-tubes within the stock.

In the position seen in Fig. 2 it will be observed that the forward end of the tube is in line with the barrel *b*. It is this forward portion of the magazine which acts to carry or transfer the cartridges, one by one, each time it is swung up, from the body of the magazine to the barrel. When it is swung up to the position shown in Fig. 2 the spring *k*, pressing forward the line of cartridges, forces the forward one into the barrel, the flange upon the rear end of the cartridge-shell fitting into an enlargement of the extreme end of the barrel, and so that the rear end of the cartridge shall be flush, or nearly flush, with the end of the barrel and the cartridge held in position for firing.

The other position which the magazine-tube and the breech-piece are made to assume (when the arm is fired) is seen in Fig. 1. In this position the carrier end of the magazine-tube is in line with a supply-opening, *l*, formed in the frame or receiver *a*, through which the magazine is supplied with cartridges, as will be readily understood, a stopper, *m*, filling said tube when the magazine has been charged.

It will thus be seen that the magazine can, through an opening in the frame or receiver, be filled with cartridges while the breech is closed and all the operative parts are in their place of rest.

The conjoined movement of the magazine-tube and the breech-piece, resulting in the loading and firing of the pistol, is produced through a trigger-lever, *c*. Just above the finger-ring *n* this lever turns upon a pin, *o*, its upper end extending up within the cavity of the stock, and upon one side of and in juxtaposition with the breech-piece *d*. Supposing the arm to have been fired, the upper end of the lever *c* is in the position shown in Fig. 1, its forward side or edge being in contact with or near the end of the barrel. By drawing back the finger-ring, the upper end of the lever, abutting against the barrel, pushes the barrel forward until the end of the barrel passes beyond the end of the magazine-tube, (or the surface of the plate thereupon,) when the spring *i* tilts up the magazine-tube and the breech-piece into the position seen in Fig. 2, the pressure of the trigger-lever carrying the end of the barrel a little beyond the path of movement of the end of the tube *e*, so as to allow of the easy ascent of the tube, and the barrel-spring *g* causing said end to impinge against the end of the magazine-tube *e*, when the pressure upon the trigger-lever is released.

It will be obvious that the magazine-tube will now keep the barrel from receding, leaving the trigger-lever free. As the magazine-tube reaches this position its forward cartridge will be projected into the barrel, as before explained.

The parts are now in the position seen in Fig. 2, the piece being cocked, ready to be fired, which firing is effected as follows: The finger-ring of the trigger-lever is pressed forward, carrying the upper end of the lever back. A spring, *p*, attached to said lever, carries at its upper end a pin, *q*, which projects through the lever, as seen in Fig. 7. As the upper end of the lever is forced back the end of this pin strikes upon an incline, *r*, in the face of the breech-piece. (Seen in Fig. 2 and also in Fig. 6.) This incline forces back the pin *q* and spring *p*, causing the pin to slide over the side face of the breech-block until in its movement it reaches a depression or groove, *s*, in the face of the block, when the spring forces back the pin, which enters this groove at its lower end, the other parts remaining stationary in the position shown in Fig. 2 during this movement of the trigger-lever. This brings said lever into the position seen by dotted lines in Fig. 2. If now the finger-ring or trigger *c* be drawn back, it will be obvious that the action of the pin *q* upon the lower surface of the groove *s* will depress the magazine-tube and the breech-block. When in this movement the upper surface of the tube *e*, or the plate surmounting the same, is carried below or beyond the lower edge of the barrel *b*, which impinges against it, said barrel will be projected or forced by its spring back against the forward face of the breech-piece *d*, as shown in Fig. 1, the piercer *t* penetrating the rear end of the cartridge by the percussion of the barrel, thereby exploding the fulminate of the cartridge and firing the pistol. The rear movement of the barrel is or may be arrested by a cheek or shoulder in the frame, its movement, however, being always sufficient to allow the explosion of the cartridge by percussion against the breech-piece or its cartridge-piercer *t*.

The firing of the pistol by the rear movement of its barrel leaves the parts in position as seen in Fig. 1. Pressure forward of the upper end of the lever will then carry back the pin *q*, allowing it to ride over the face of the breech-block to force forward the barrel. Each depression of the magazine-tube each time the pistol is fired carries its forward end or carrier into line with the supply-opening, so that whenever it is desirable to reload the magazine after a discharge it can be effected.

The shell of the cartridge after firing is removed as follows: A spring-tooth, *u*, (see Figs. 2, 5, and 6,) projects from the upper surface of the magazine-tube, or the cap-plate surmounting the same. This tooth fits into or enters a slot, *v*, made in the rear end of the barrel, as seen in Fig. 4. When the piece is fired by the spring movement of the barrel to the rear the flange of the cartridge slips over this tooth, which slides up in front of said flange, as will be readily understood. When next the barrel is slid forward by the trigger-lever the hold of the tooth upon the flange of the cartridge detains the cartridge-shell, allowing the barrel to slide away therefrom until, as the barrel is projected beyond the magazine-tube, leaving the shell detained thereupon, the upward movement of the magazine-tube throws the shell off the piece. This upward movement of the magazine-tube carries its mouth again into line with the discharge-barrel. The spring in the tube again forces the forward cartridge into the barrel, thereby reloading it. The trigger-lever again forces down the cartridge-tube and breech-piece, thereby again discharging the piece, which operation is repeated until the magazine is exhausted of cartridges and replenished for continued use of the pistol.

The particular construction of the various parts described may be varied from that shown in the drawings without departure from the spirit of my invention, their arrangement and method of operation, however, being those preferred by me.

I claim—

1. In a magazine fire-arm, the combination, with the barrel and breech-piece and independent frame, which receives said parts and is provided with a cartridge-filling opening, of a magazine whose carrier portion or end is in communication, when raised, with the barrel, and, when lowered, with the cartridge-filling opening in the frame, under the arrangement substantially as set forth, so that when the breech is closed and the operative parts are in their place of rest cartridges may be entered into the magazine through the cartridge-filling opening in the frame.

2. In a magazine fire-arm, the combination, substantially as hereinbefore set forth, of a barrel, a breech-piece, an independent frame, which receives said parts and is formed with a cartridge-filling opening, a removable stopper for closing the same, and a magazine whose carrier end or portion communicates, when raised, with the said barrel, and when depressed with the said cartridge-filling opening.

3. In a fire-arm, the combination, substantially as and for the purposes hereinbefore set forth, with a percussion or breech block, of a longitudinally-sliding and rearwardly spring-impelled barrel.

4. The combination, substantially as hereinbefore set forth, of the swinging breech, the magazine-tube attached thereto, the longitudinally-sliding and rearwardly spring-impelled barrel, and the frame which receives said parts.

5. The oscillating magazine, hung upon a pivot in the frame and arranged to operate in connection with the barrel, substantially as hereinbefore set forth.

6. The combination, substantially as hereinbefore set forth, of the sliding and rearwardly spring-impelled barrel, the swinging breech-block and magazine-tube, the trigger-lever, which operates both barrel and breech-block, and the breech-block-elevating spring.

7. The combination, substantially as before set forth, with the longitudinally-sliding barrel, of the breech-block and magazine-tube and the retractor.

8. The combination, with the sliding barrel, of its inclosing stationary case or cylinder and the barrel-impelling spring, substantially as and for the purposes set forth.

In testimony whereof I have hereunto set my hand this 7th day of October, 1880.

HENRY F. WHEELER.

Witnesses:
S. S. MILLETT,
J. J. SWEENEY.